(12) United States Patent
Kuhn et al.

(10) Patent No.: US 7,375,824 B2
(45) Date of Patent: May 20, 2008

(54) INTERFEROMETER FOR MEASUREMENT OF DOME-LIKE OBJECTS

(76) Inventors: William P. Kuhn, 9181 E. Ocotillo Dr., Tucson, AZ (US) 85749-9446; Matthew Dubin, 3721 N. Sabino Point Pl., Tucson, AZ (US) 85750

(*) Notice: Subject to any disclaimer, the term of this patent is extended or adjusted under 35 U.S.C. 154(b) by 162 days.

(21) Appl. No.: 11/488,532

(22) Filed: Jul. 17, 2006

(65) Prior Publication Data

US 2007/0019207 A1 Jan. 25, 2007

Related U.S. Application Data

(60) Provisional application No. 60/700,986, filed on Jul. 19, 2005.

(51) Int. Cl.
*G01B 9/02* (2006.01)
(52) U.S. Cl. ...................................... 356/513
(58) Field of Classification Search ................ 356/513, 356/515
See application file for complete search history.

(56) References Cited

U.S. PATENT DOCUMENTS 5,410,407 A * 4/1995 Zielinski et al. ............ 356/513
5,410,408 A * 4/1995 Evans et al. ................ 356/513

OTHER PUBLICATIONS

Simpson, F.A., B.H. Oland, and J. Meckel, "Testing Convex Ashperic Lens Surfaces with a Modified Hindle Arrangement," Optical Engineering, May/Jun. 1974, vol. 13-No. 3, pp. G101,G103,G105-G107,G109.
Optical Shop Testing, 2nd Edition, Malacara, Daniel, Editor, John Wiley Sons, Inc., New York, 1992, pp. 450-452.

* cited by examiner

*Primary Examiner*—Hwa S Lee (Andrew)
(74) *Attorney, Agent, or Firm*—David W. Collins

(57) ABSTRACT

An interferometer is provided, comprising a source, a unit under test (UUT) with at least a first surface and second surface, a reflective optic, a detector and light from the source. The light is transmitted through the unit under test and reflects off of the reflective optic, which directs the light back to the unit under test. A first portion of light is reflected off the first surface of the UUT. A second portion of light is reflected off the second surface of the UUT. The first and second portions of light are then reflected by the reflective optic and are then transmitted through the UUT. The two portions of light are incident on the detector, where the first and second portions of light coherently add and the interference pattern is detected by the detector. A method for measuring the transmitted wavefront of the UUT is also provided.

16 Claims, 13 Drawing Sheets

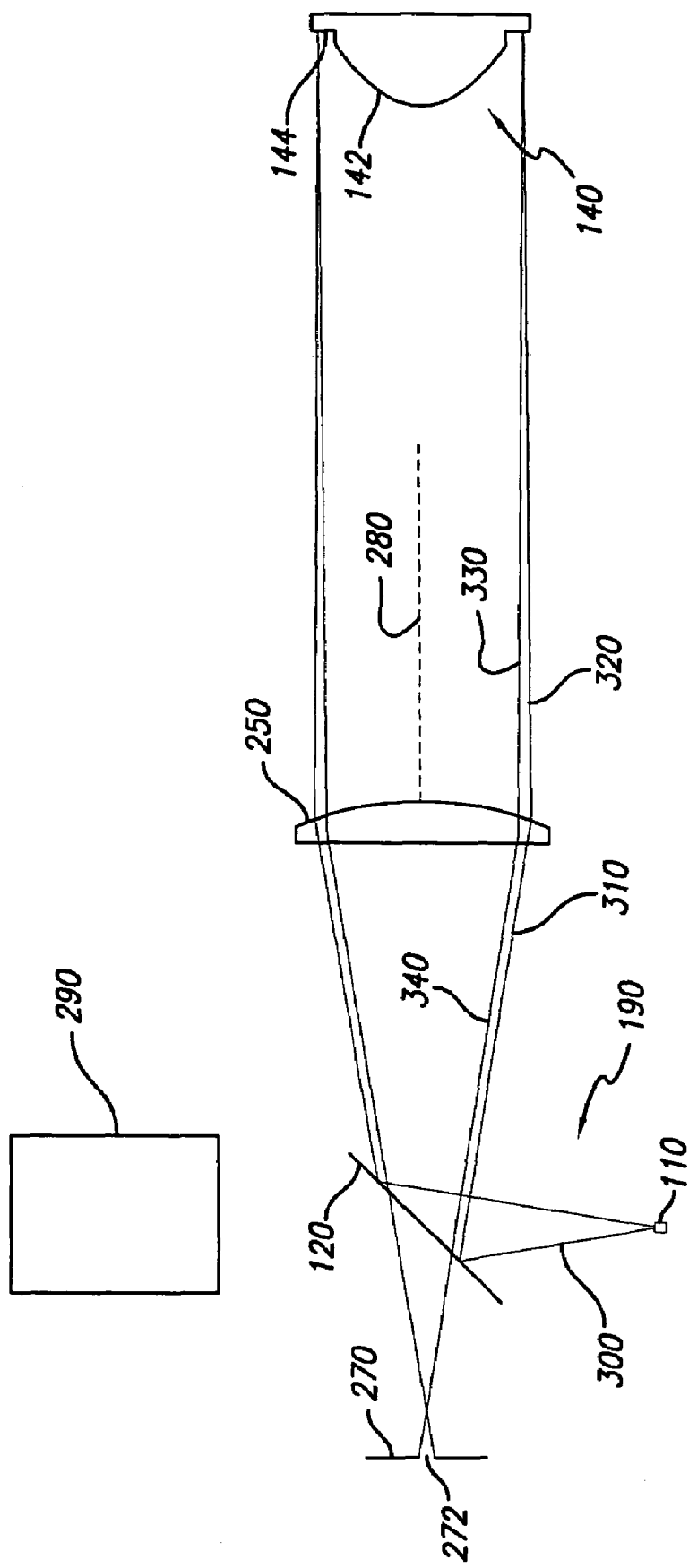

INTERFEROMETER FOR MEASUREMENT OF DOME-LIKE OBJECTS

CROSS-REFERENCE TO RELATED APPLICATION

The present application claims priority from provisional application Ser. No. 60/700,986, filed Jul. 19, 2005.

The present application is also related to application Ser. No. 11/488,941, filed concurrently herewith, entitled "Time-Delayed Source and Interferometric Measurement of Windows and Domes", by the present inventors and to application Ser. No. 11/488,946, also filed concurrently herewith, entitled "Interferometer for Measurement of Dome-Like Objects", also by the present inventors.

BACKGROUND OF THE INVENTION

A refractive optical element acts upon a wavefront that is transmitted through the element. To ensure proper functioning of the optical element or as part of the manufacturing process, a measurement of the transmitted wavefront through an optical element may be performed. One way to directly measure the transmitted wavefront is to use an interferometer, and many different configurations of interferometers are described in prior art. In order to measure the transmitted wavefront of an optic, one usually aligns the unit under test (UUT) such that it is part of a null optical configuration. There are many null configurations that are described in the prior art such as in Malacara, Daniel, (ed.), *Optical Shop Testing, Second Edition*, John Wiley & Sons, Inc., 1992. One class of optics that has proven difficult to test is dome-like optics.

The surfaces, not the transmitted wavefront, of dome-like optics have been tested in various configurations. For instance in Simpson et al, a "Hindle shell test" is described (F. A. Simpson, et al, "Testing Convex Aspheric Lens Surfaces with a Modified Hindle Arrangement," *Opt. Eng.*, 13, G101 (1974)). In the configuration described, a conventional interferometer, such as a Fizeau type, is used to measure the quality of a single surface of a lens, not the transmitted wavefront of the Hindle shell. In particular, a partially reflective coating is applied to the inner surface of the Hindle shell and an interferometer is used to compare the single surface of the lens with the interferometer reference surface. While not described in the paper, one could use this approach to test a surface of the Hindle shell if the partially reflective coating is applied. Adding a coating to the UUT that must subsequently be removed is an undesirable step in the manufacturing process.

One reason that it is difficult to test dome-like optics is that the surfaces are typically concentric, making it difficult to separate light reflected by one surface from the light reflected by the other. A conventional interferometer measures the shape of a surface by comparing (i.e., interfering) the light reflected from a single surface with the light reflected by a reference surface. However, the concentric surfaces of a dome-like optic result in multiple beam interference and erroneous results. This makes calculating the figure of the surface difficult. It is possible to index match one surface of the dome-like optic so that one reflection is suppressed, but this adds additional steps to the testing process.

Another reason why dome-like optics are difficult to test is that they typically subtend a large portion of a hemisphere. The numerical aperture of interferometer test optics can only capture a sub-aperture in each measurement. One can then hope that if the sub-apertures are of adequate quality, then the entire dome is of adequate quality. Alternatively, additional data processing complexity can be added to assemble a full surface map from the sub-aperture data, which is often referred to as stitching. This is a time-consuming process and the motion of the dome-like optic between measurements can add error.

An even more challenging problem is the measurement of a dome-like optic when the index of refraction varies. When this is the case, measuring the shape of the two surfaces of the dome-like optic does not ensure that the transmitted wavefront through the dome-like optic is of adequate quality. This means that direct measurement of the transmitted wavefront is required. For a dome-like optic that subtends a large angle, the current measurement approach is to use sub-aperture measurements. When this is done, errors due to misalignments between the interferometer, null optic (if used) and the UUT and the fabrication errors in the optic cannot be easily distinguished, if at all.

What is required is an approach for measuring the transmitted wavefront of a dome or dome-like optic where the full aperture of the optic can be measured simultaneously. It is also desirable to have an approach that will work with optics that are not spherical and whose thickness or index of refraction varies with position.

SUMMARY OF THE INVENTION

An interferometer is provided, comprising a source for emitting light, a support for supporting a unit under test (UUT) where the UUT has at least a first surface and second surface, a reflective optic, a detector and light from the source. The light is transmitted through the unit under test and reflects off of the reflective optic, which directs the light back to the unit under test. A first portion of light is reflected off the first surface of the UUT and a second portion of light is reflected off the second surface of the UUT. The first and second portions of light are then reflected by the reflective optic and are then transmitted through the unit under test. The two portions of light are incident on the detector, where the first and second portions of light coherently add and the interference pattern is detected by the detector.

A method is provided for measuring the transmitted wavefront of a unit under test. The method comprises:
  providing an interferometer comprising a source for emitting light, a support for supporting a unit under test having at least a first surface and second surface, a reflective optic, and a detector;
  providing the unit under test in the interferometer;
  transmitting the light from the source through the unit under test to the reflective optic, where it reflects off the reflective optic and is directed back to the unit under test where a first portion of light is reflected off the first surface and a second portion of light is reflected off the second surface, wherein the first and second portions of light are then reflected by the reflective optic, are then transmitted through the unit under test, and are incident on the detector where the first and second portions of light coherently add; and
  detecting an interference pattern by the detector.

BRIEF DESCRIPTION OF DRAWINGS

The above and other features of the invention including various novel details of construction and combination of parts will now be more particularly described with reference to the accompanying drawings and pointed out in the claims. It will be understood that the particular interferometer apparatus embodying the invention is shown by way of illustration only and not as a limitation of the invention. The principles and features of this invention may be employed in varied and numerous embodiments without departing for the scope of the invention.

FIGS. 6 and 6A are diagrams that show one approach for aligning the reflective optic.

DETAILED DESCRIPTION OF PREFERRED EMBODIMENTS

Figure 1:
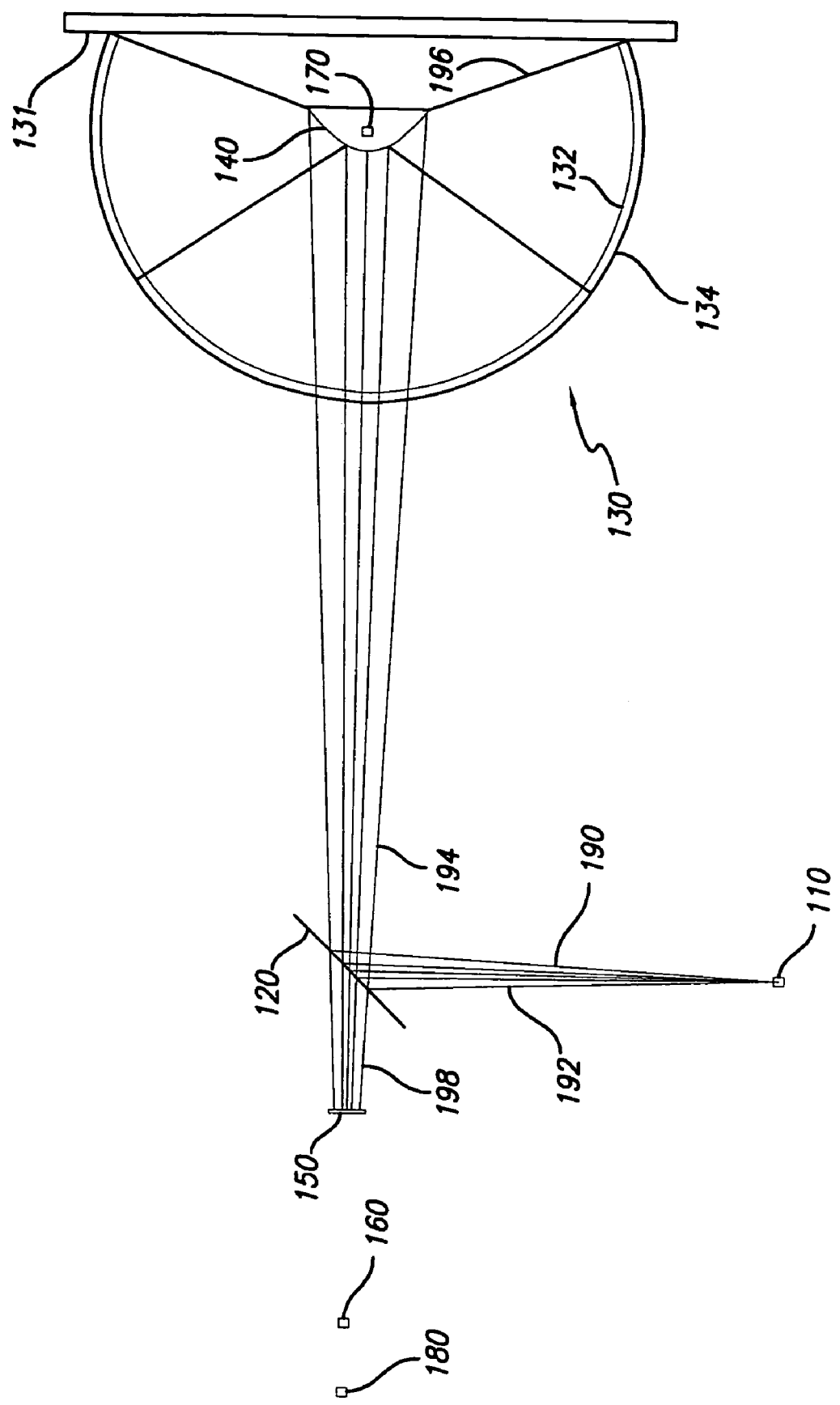
FIG. 1 is a cross-sectional diagram illustrating an embodiment of the invention.

An interferometer is described herein that is capable of measuring the full aperture, transmitted wavefront of dome-like optics. In addition, the system described has decreased sensitivity to misalignment. When light leaves the source, it is transmitted through the UUT. After this transmission, it is incident on a reflective optic that forms an image of the source that is nominally located at the center of curvature of the UUT. The source image may be either a real or virtual image. The light is then incident on the dome-like optic and the Fresnel reflections from the surfaces of the UUT form images of the source, which are also nominally at the center of the UUT. The images of the source formed by Fresnel reflections from the surfaces of the UUT are reflected by the reflective optic and are then transmitted through the UUT again. The light from the Fresnel reflections is imaged onto a sensor where they coherently add, and the interference pattern formed is detected by an image sensor and recorded. The interference pattern is due to the double-pass transmitted wavefront of the UUT.

The interference pattern is produced by two wavefronts, both of which originate from the same source, but one is reflected from the UUT inner surface and the other from the UUT outer surface. The two wavefronts are essentially common path except that one traverses the space between the inner and outer surfaces twice (once in each direction). The result of having all system components, other than the UUT, be common path is a system where the tolerances of the optical elements and their alignment are relatively loose, and the interference pattern can be observed even when the UUT is grossly misaligned.

The interferometer is set up so that it approximates a null test. In an ideal null test, the rays retrace their exact paths so that no additional errors are introduced. Because the errors introduced due to the non-null configuration are substantially the same for both reflections, the errors substantially cancel. This results in a substantially null interference pattern even though the interferometer is not perfectly aligned. The only requirement is that the light reflected from the UUT reaches the detector so the interference pattern can be recorded.

An embodiment of the present invention is to use a conic mirror for the reflective optic. The reason for this is that a conic can form a diffraction-limited image of the source as long as the source is located at a focus of the conic. When the other focus of the conic is aligned to the center of curvature of the UUT, a null configuration can be obtained. If the conic is concave, the system can be configured such that a real image of the source is formed at the center of the UUT. When a real image is formed, it is possible to physically measure its location with respect to other optical or mechanical data to verify that it is in the correct location. A general asphere could be used instead of a conic if one desired to compensate for aberrations added by other optical components.

Another embodiment of the present invention is to use a convex conic for the reflective optic. The advantage of this approach is that this mirror allows for the testing of hemispherical and hyper-hemispherical UUTS. Because the mirror can be made such that the image of the source fills more than a hemisphere, the limitation is the ability to manufacture the mirror.

Yet another embodiment of the present invention is to use a parabolic reflector. One of the foci of a parabola is located at infinity. This means that translations of the parabola in X, Y or Z do not result in a misalignment of the parabola's long focus to the source. If a hyperbola were used instead, then the mirror has to be aligned in five degrees of freedom (three positional and two rotational) in order to align the focus to the source. If a parabola is used, it only has to be aligned well in two degrees of freedom (tip and tilt) to align the mirror to the source. The two side-to-side translations only need to be controlled well enough to ensure uniform illumination. The motion along the optical axis of the parabola will not affect the alignment to the source at all.

Still another embodiment of the present invention is to incorporate an alignment surface in the reflective optic. This surface should be outside of the required clear aperture of the mirror and should be selected such that it forms an auto-reflected image of the source. In other words, the reflection from the alignment surface forms an image of the source that is coincident with the source. This alignment can be easily verified. For a hyperbola or an ellipse, the alignment surface is a section of a sphere. The radius of the sphere is such that its center of curvature is located at one of the conic mirror's foci. For a parabola, the alignment surface is a flat. In some cases, it may be desirable to make the alignment surface an asphere to compensate for aberrations.

Yet another embodiment of the present invention is to defocus the source (or image of the source) from the ideal location to compensate for the optical power introduced by the UUT. This means that the source appears to be at the correct location only when the UUT is in its test location in the system. This means that the alignment surface could be modified such that its center of curvature is located at the source when the UUT is not present. This means that alignment surface is not aligned at the mirror's focus.

A still further embodiment of the present invention is to include an alignment device that is located at the image of the source that is created by the UUT and the reflective optic. This alignment device can be used for alignment purposes as well as block a significant amount of stray light. If the alignment device is aligned such that its location matches that of the source, then one can align the reflective optic and the UUT to the alignment device to ensure that measurement errors are low.

Still another embodiment of the present invention is to use a source that allows for the adjustment of the phase between the two Fresnel reflections from the UUT. This allows for various phase shifting algorithms to be implemented. One such source is a time-delayed source (TDS). Another source is a wavelength shifting source.

FIG. 1 is a cross-sectional schematic diagram of an embodiment of the invention. A source that emits light 110 is positioned so that the emitted light 190 is directed towards beamsplitter 120. Several rays are represented in the figure, and it is useful to trace one ray 192 through the system to understand how the interferometer operates. The ray of interest 192 is reflected by beamsplitter 120 and the ray propagates along path 194 towards the unit under test (UUT) 130, which is supported in the interferometer by conventional support means 131. Most of the power is transmitted through UUT 130 and is incident on a reflective optic 140. After reflection, the ray propagates along ray path 196 to the UUT 130. A first portion of light is reflected from the first surface 132 of the UUT 130 and a second portion of light is reflected from the second surface 134 of the UUT 130. Both reflected portions of light nearly retrace the incident path shown as 196. Based on the properties of the UUT 130 and the quality of the alignment, the reflected light may not follow the incident path exactly. For the sake of clarity, the paths are shown as coincident in the figure. The two reflected portions of light are then reflected by the reflective optic 140 and the light retraces its path towards the source. The single ray propagating along path 194 towards beamsplitter 120 is retracing the path from the beamsplitter 120. Now the path of interest is the light that is transmitted through the beamsplitter 120 and follows path 198. The light is then incident on detector 150. The first and second portions of light coherently add and the interference pattern is detected by the detector. In this example, rays are used to show the propagation of light. This is being done for clarity and it should be understood that the rays represent wavefronts of light.

FIG. 1 also shows an embodiment for the arrangement of the optical elements. Reflective optic 140 can be a conic mirror. In this example, it is a hyperbola whose long focus is represented as a point 160 and whose short focus is represented as a point 170. In this example, the UUT 130 is a hyper-hemispherical shell made of two concentric spherical surfaces. The centers of curvature of surface 132 and surface 134 are nominally positioned to be coincident with the short focus 170 of the reflective optic 140. The UUT 130 has some optical power such that the image 180 of the long focus 160 is seen when the light passes through the UUT 130. The source 110 is positioned so that it is a mirror image of the image of the long focus 180 defined by the reflection in the beamsplitter 120. When the light from the source is reflected by the beamsplitter 120 and transmitted through the UUT 130, it appears as if it originated at the long focus 160 of the reflective optic 140. A source, real or virtual, placed at the long focus 160 of the reflective optic 140 will form an image located at the short focus 170. This results in a small, virtual image of the source 110 at the short focus 170 of the reflective optic 140. This can also be thought of as a spherical wave being emitted from the short focus 170. Since the centers of curvature of surfaces 132 and 134 are also proximate to the short focus 170, the spherical wave will substantially match the shape of the surfaces 132 and 134.

Figure 2:
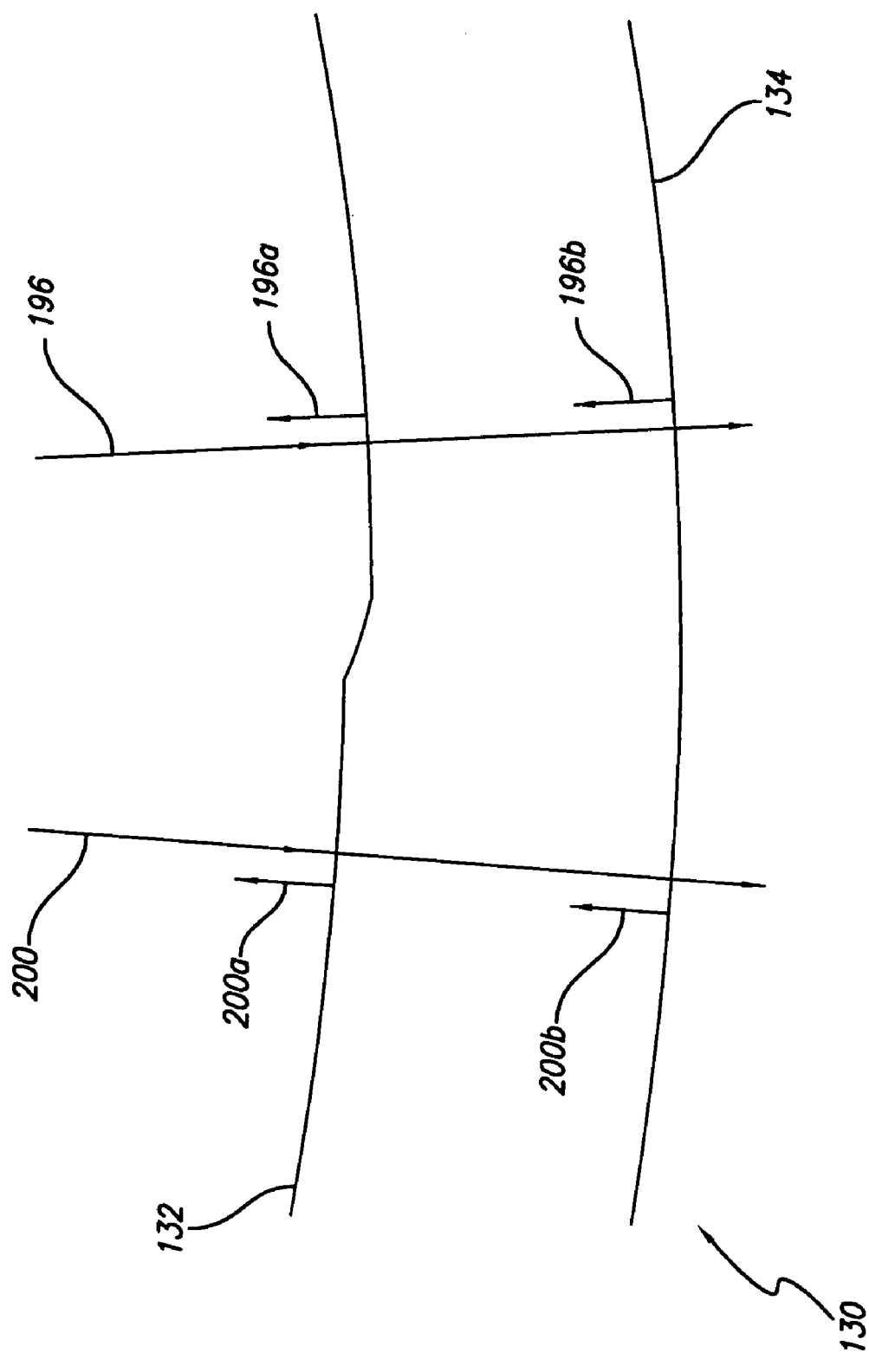
FIG. 2 is a diagram of the unit under test that demonstrates the reflections of interest.

FIG. 2 shows a magnified view of the UUT 130. Ray 196 is shown near UUT 130. Ray 196 is coming from reflective optic 140, which is not shown. The arrowhead on the ray indicates the direction of propagation. When the light is incident on the first surface 132, some of the incident light will be reflected due to Fresnel reflections. This portion of reflected light 196a is shown displaced from the incident ray 196. The displacement of the ray along surface 132 is done solely for clarity. In reality, ray 196a intersects surface 132 at the same location as ray 196. The reflected portion of light 196a is directed towards the reflective optic 140. The portion of ray 196 transmitted through surface 132 continues until it reaches the second surface 134. Here a second portion of light 196b will undergo Fresnel reflection. Once again, the arrow representing the second portion of light 196b has been displaced from its actual intersection location with surface 134 for clarity. Both the first portion 196a and the second portion 196b will propagate back through the system and reach the detector 150. The first and second portion 196a, 196b will coherently add. The phase between the two portions of light will be determined by the physical thickness of the UUT 130 where the ray 196 passes through it as well as the index of refraction.

A second ray 200 coming from the reflective optic 140 is shown. A first portion of light 200a is reflected from the first surface 132 and a second portion of light 200b is reflected from the second surface 134. As before, the arrows representing the reflected light have been shifted for clarity. The ray 200 is incident on the UUT 130 in a region where the UUT 130 is thicker than in the region around ray 196. Because the physical thickness of the UUT 130 has changed, the phase between the reflected portion 200a and 200b will be different than the phase between 196a and 196b. The dependence of phase or optical path length, as a function of position on the UUT 130 results in an interference pattern on the detector that is directly related to the physical thickness of the UUT 130 and the local index of refraction. Since the physical thickness and local index of refraction define the transmitted wavefront, the interference pattern is a measurement of the transmitted wavefront in double-pass.

One of the advantages of the invention is that the two portions of light that interfere are common path on the way to the UUT 130 and they are substantially common path on the way from the UUT 130 to the detector 150. The only region in which the two reflected wavefronts are not substantially common path is between surface 132 and surface 134 of UUT 130, where the difference between the two paths is the means by which the transmitted wavefront is measured. Since the first portion of light 196a is reflected light from ray 196 and the second portion of light 196b is also reflected light from ray 196, any wavefront errors introduced by imperfect optics or alignment errors will be identical in both portions of light. The second portion of light 196b passes through the UUT 130 twice and records the transmitted wavefront. If the UUT 130 is not perfect, the path that the second portion of light 196b takes to the detector will be slightly different than the path that the first portion of light 196a takes. This slightly different path results in what is commonly called retrace error. Retrace error is a common problem in interferometers and it is known that the retrace error tends to zero as the part being tested approaches perfection. Methods for dealing with retrace error are known in the art. If the UUT 130 is misaligned, the errors introduced in the first portion of reflected light will be substantially identical to the errors introduced in the second portion of reflected light. This is because the first surface 132 and the second surface 134 always move together. This makes the transmitted wavefront measurement substantially insensitive to misalignment.

For any UUT 130 that is of modest quality, the first portion of light 196a and the second portion of light 196b will have a substantially common path from the UUT 130 to the detector 150. Since so much of the path is common, the interferometer is substantially insensitive to misalignment and environmental changes. If one of the components is misaligned, the errors introduced into the first and second portions of light 196a and 196b will be substantially identical and cancel in the interference pattern. This is also true if one of the optical components does not have its ideal shape. A lens with astigmatism is one example. The interferometer is also insensitive to many environmental factors. For example, normal room air turbulence will not have a significant impact on the system because the turbulence will be substantially common path. The real significance of this insensitivity is in the alignment of the reflective optic 140 and the UUT 130. In the example shown in FIG. 1, both optics subtend more than $2\pi$ steradians from the short focus 170. Typically, optics that are this fast are very sensitive to misalignment. Because of how much of the interferometer is common path, the alignment tolerances on these components are reasonable. This advantage will still be true even if the optics in question subtend less than a hemisphere.

Figure 3:
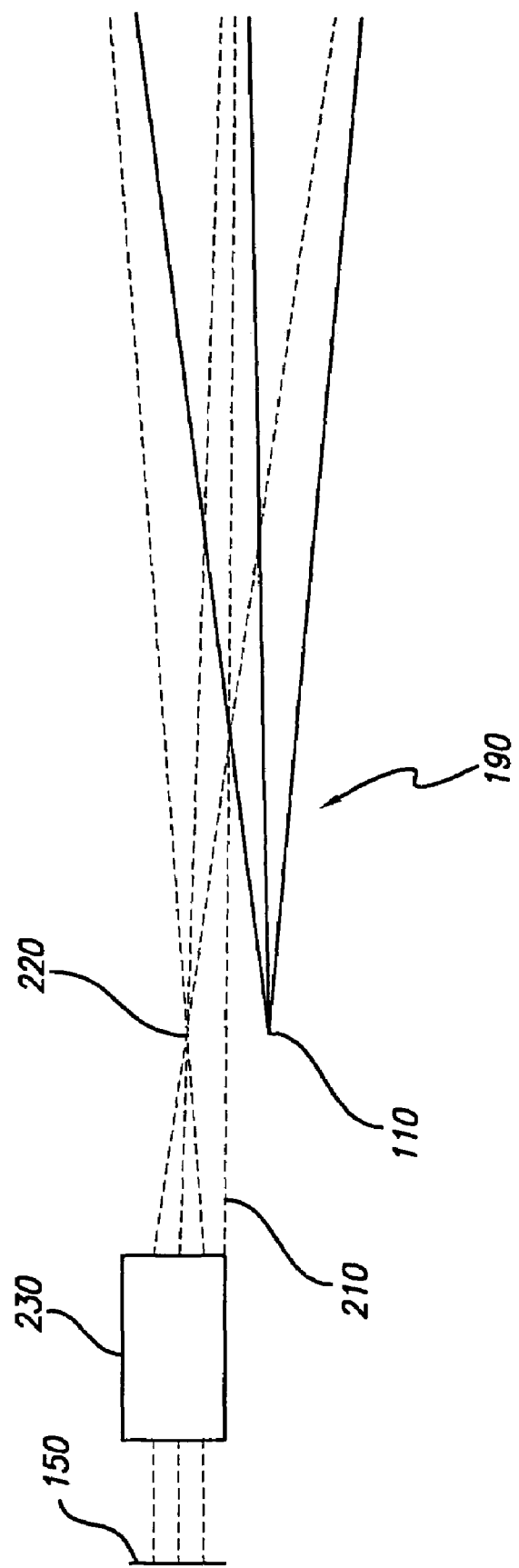
FIG. 3 is a close-up view of the region around the source that demonstrates one way to practice the invention without a beamsplitter.

FIG. 3 shows one configuration in which beamsplitter 120 is not required. The optical axis of the UUT 130 and the reflective optic 140 is shown as 210. In FIG. 3, the source 110 is not on the optical axis 210, but the rays 190 are passed by the system. When this is the case, the source is imaged to a point 220, which is on the opposite side of the optical axis 210. This geometry could be constructed with a fiber light source or a small mirror in the vicinity of an image of the source. In this example, the light then passes through an optical system 230, which directs the light onto the sensor 150. While it is not required, in an embodiment, the optical system 230 may image the UUT 130 (not shown in this figure) onto the detector 150.

Figure 4:
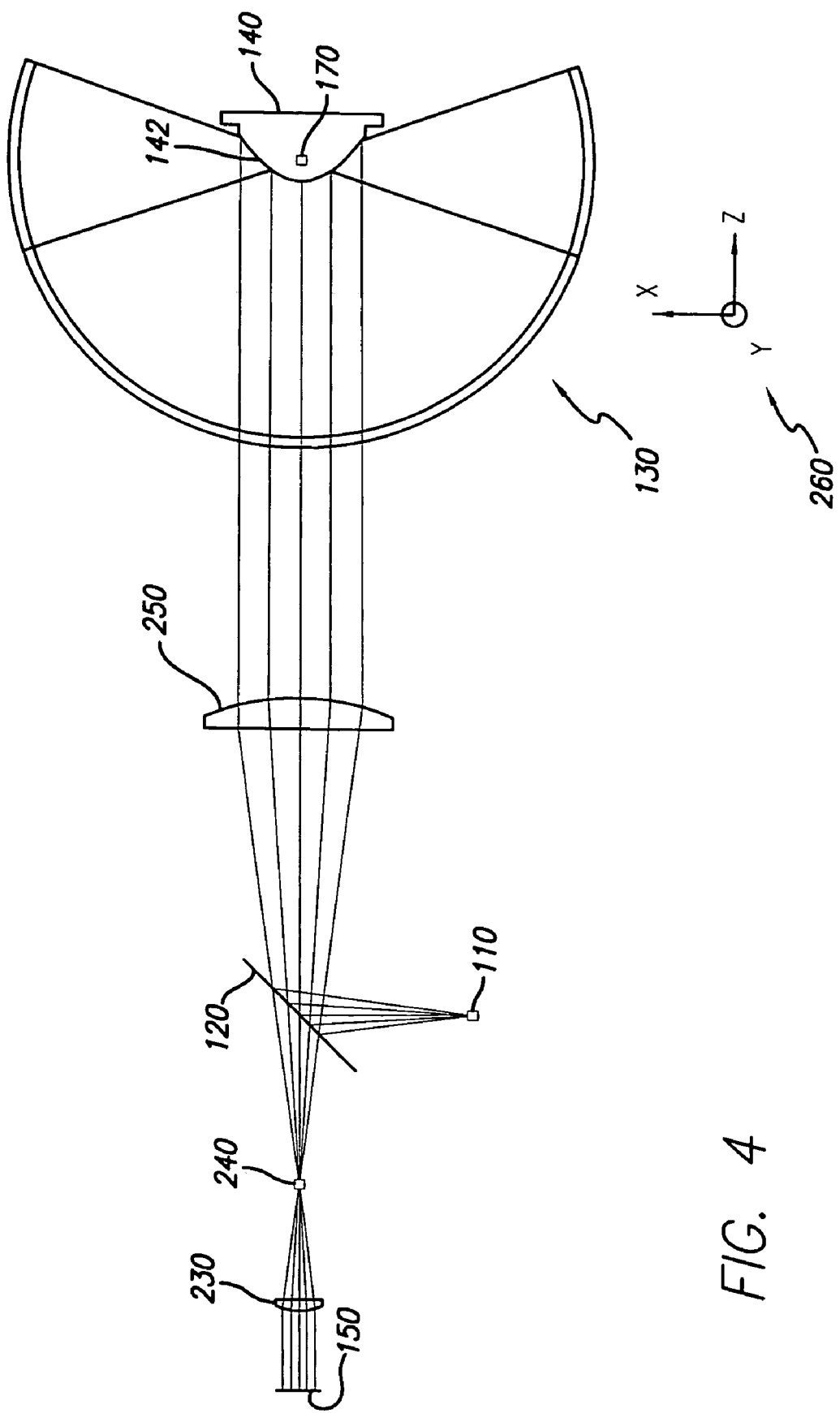
FIG. 4 is a cross-sectional diagram illustrating another embodiment of the invention.

FIG. 4 shows another embodiment of the present invention. In this example, the reflective optic 140 has a parabolic surface 142. This example has a convex reflective optic 140 because the UUT 130 subtends more than a hemisphere from the short focus 170 of the reflective optic 140. When the reflective optic 140 is a parabola 142, the long focus is located at infinity. FIG. 4 shows one way that the source 110 can be imaged at the parabola's long focus. An optic 250 is used to image the light reflected off of the beamsplitter 120 so that the source 110 appears to be located at infinity. While a single element is shown for optic 250, a more complex system may be used including multiple optical elements. When the UUT 130 and the parabola 142 subtend relatively small solid angles from the short focus 170, source 110 may be placed in the focal plane of optic 250. This results in light incident on the parabolic surface 142 that may not be well collimated because the UUT 130 may have some optical power that will cause the beam to defocus slightly. For testing of many designs of UUT 130, this is acceptable. When the UUT 130 subtends a large angle, it may be desired to place source 110 at a plane other than the focal plane of optic 250. One location for source 110 results in substantially collimated light incident on the parabola 142 after transmission through UUT 130. Another arrangement that is also desirable is to have the reflective optic 140 depart from a parabola to compensate for the optical power introduced by the UUT 130. The first and second portions of light that are reflected off of the UUT 130 are substantially brought to focus near point 240. Point 240 is the image of the reflective optics 140 long focus. Optical system 230 is positioned such that point 240 is proximate to the front focal plane of optical system 230. This results in substantially collimated light incident on the detector 150. In an embodiment, the location for detector 150 may be at the image of the UUT 130 that is formed by all of the optical elements that operate on the first and second portions of light reflected from the UUT 130.

One of the reasons that the reflective optic 140 has a parabolic surface 142 is because it only has to be aligned well in two degrees of freedom. The coordinate system 260 shows the directions defined as X, Y and Z. For this discussion, rotation around X is defined as tip and rotation around Y is defined as tilt. When the reflective optic 140 has a parabolic surface 142, it must be well aligned in tip and tilt. The parabolic surface 142 is not sensitive to translational misalignments (motion along X, Y or Z). The light incident on the parabolic surface 142 is substantially collimated, therefore the wavefront quality is highly insensitive to the translational alignment of the parabolic surface 142 to the beam. Rather, the translational alignment of the parabolic surface 142 is constrained by ensuring that the illumination pattern is adequately centered. The UUT 130 must also be aligned to the parabolic surface 142. The light must pass through the UUT 130 before reaching the parabolic surface 142, so large misalignments could result in some measurement error. In most cases, the beam exiting optic 250 will have a small numerical aperture. This means that the alignment of the UUT 130 to the optical axis defined by the source 110 and the optic 250 is not critical.

Figure 5:
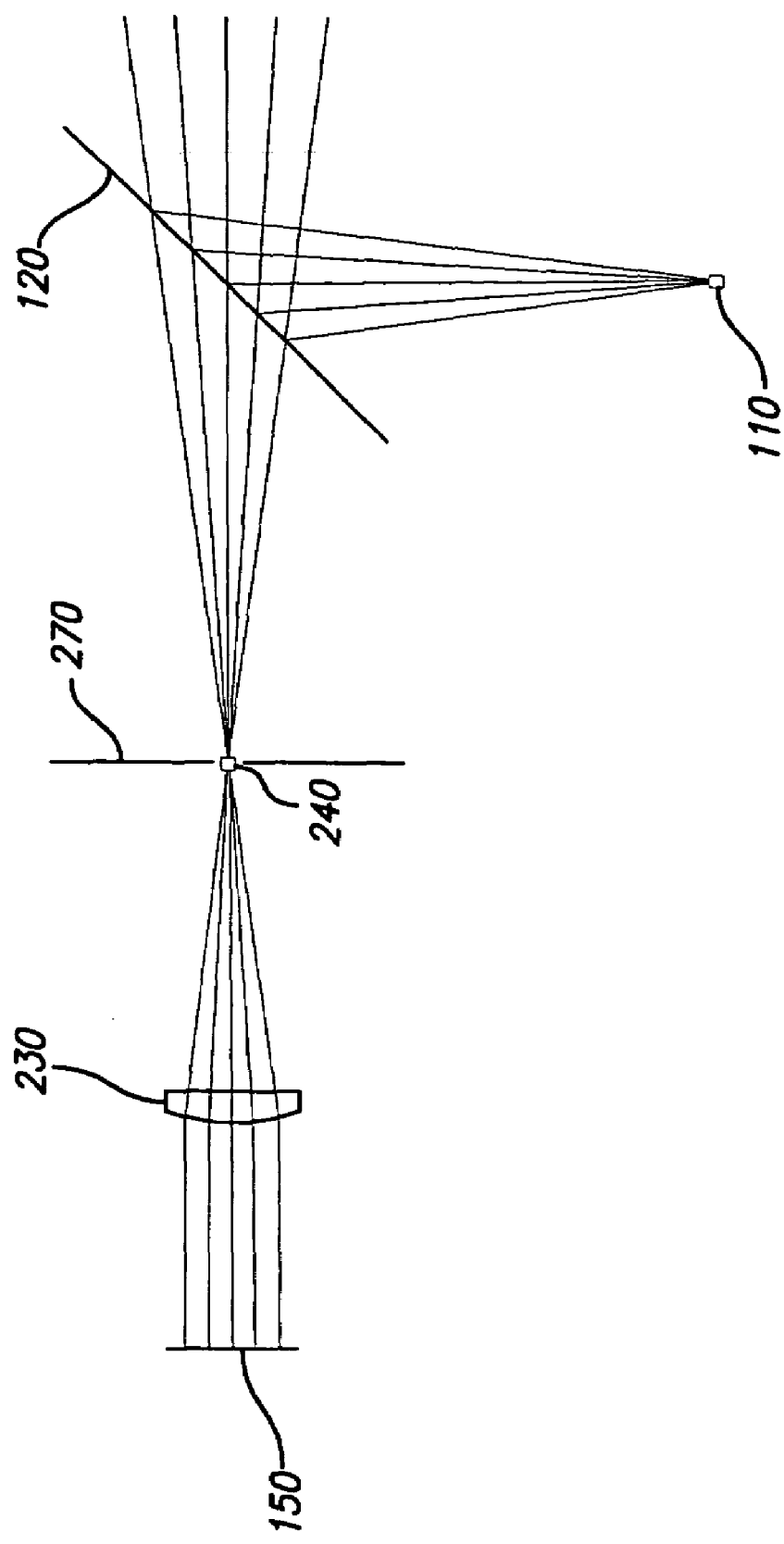
FIG. 5 is a diagram demonstrating how an alignment device can be incorporated into the system.

FIG. 5 shows a slight modification of the design that includes an alignment device 270 located proximate to point 240. The images of source 110 formed by the first and second portions of light, which are typically proximate to the image of the reflective optics long focus 240. The alignment device could be a pinhole, crosshairs, decentered reference mark or similar device. The purpose of the alignment device is to provide a known location that can be used to align focused spots. For example, a pinhole can be used where the goal is to obtain a focused spot at the center of the pinhole. Depending on the system, the pinhole could be a fraction of a millimeter in diameter to many millimeters in diameter. If removable and replaceable crosshairs are used, the goal is to obtain a focused spot at the intersection of the crosshairs. An alignment mark, such as a dot or an arrow, can be decentered from the desired location by a known amount in a known direction. In this case, when a focused spot is offset from the alignment device by the correct amount, the optic is aligned.

One possible location for the alignment device 270 is at the mirror image of the source 110 as defined by the beamsplitter 120. It should be noted that the alignment device 270 could be aligned to any image of the source including virtual images. A desired location may be in close physical proximity to the beamsplitter 120 and the source 110 to facilitate a stable mechanical design. There are several approaches known in the art for aligning the alignment device 270 to the source 110 and the beamsplitter 120. One approach utilizes a spherical mirror to reflect light transmitted by the beamsplitter 120. This mirror is positioned so that the source is proximate to its center of curvature. When this condition is met, the mirror will form an image of the source upon itself and another image that is the mirror image of source 110 defined by the beamsplitter 120. Now one can use any number of conventional means to align the alignment device to the mirror image of the source. One possibility is to use a video microscope. Of course, the source 110 and alignment device 270 may be switched, if desired, in any of the foregoing configurations.

FIG. 6 shows one approach for aligning the reflective optic 140. In this example, a parabolic reflective surface 142 is used. The source 110 and the optic 250 define an optical axis 280. The parabola 142 may be aligned so that its axis is parallel to the optical axis 280. To facilitate this, an alignment surface 144 is included in reflective optic 140. The alignment surface 144 may be an integral part of the reflective optic 140, it may be a separate part that is attached to the reflective optic 140 or it may be part of the mounting structure around the reflective optic 140. In one embodiment, the alignment surface is a sphere whose center of curvature is proximate to the long focus of the reflective optic 140. In the case of a parabola, the alignment surface 144 is a plane that is substantially perpendicular to the optical axis of the parabola 142. FIG. 6 shows a cross-section of reflective optic 140. The figure implies that the alignment surface 144 is a complete ring that surrounds the parabolic surface 142. Alignment surface 144 is attached to reflective optic 140. While this configuration may be employed in manufacturing, it is not a requirement. A small section of this surface is all that is required and the exact location of the clear aperture of the alignment surface 144 with respect to the rest of the features on reflective optic 140 is not critical.

When light 190 is emitted from the source 110, some of it will be incident on the alignment surface. While only two ray paths are shown in FIG. 6, it should be obvious that there will be a continuum of rays. Ray segment 300 shows one ray starting at the source 110 and propagating to the beamsplitter 120. The path of interest is the reflected ray 310. Optic 250 operates on ray 310 to produce ray 320. Ray 320 reflects off of alignment surface 144 to create ray 330. Optic 250 operates on ray 330 to create ray 340. FIG. 6 shows a pinhole 272 for alignment device 270. In this configuration, the ray 340 is blocked by alignment device 270. When the reflective optic 140 is misaligned, a ring of light will be formed on alignment device 270 that is not centered on the point that is the mirror image of source 110. The ring of light is an out-of-focus image of the source. By adjusting the tip and tilt on the reflective optic 140, this ring of light can be moved until its center is proximate to the location of the mirror image of the source 110. When a pinhole is used for the alignment device 270, the reflective optic 140 is aligned when the ring of light is substantially concentric with the pinhole.

In the configuration shown in FIG. 6, an image of the ring can be captured by imaging the light reflected off of alignment device 270 with a large field alignment system 290. This image will also capture the location of alignment device 270. Because this image will show the relative locations of the ring of light and the key features of the alignment device 270, it is not necessary to use optics that are precisely aligned to the rest of the optics. One embodiment of a large field alignment system 290 would be to place a camera at an angle that looks past the edge of beamsplitter 120. Another approach would be to insert an additional beamsplitter so that an on axis image of alignment device 270 can be captured. An approach in accordance with an embodiment, however, is to place a large field alignment system 290 that is on the opposite side of the beamsplitter 120 as the source 110. The reason for this is that an on-axis image can be captured and no additional elements are added that could shift the path of ray 340. In an embodiment, the large field alignment system 290 may be implemented without moving any of the components that are used to capture the interference pattern, including the alignment device 270. Also, no additional elements are inserted into the path before the light reaches the alignment device 270. This is done to make sure that the locations of various spots of light with respect to the alignment device 270 will remain the same regardless of whether or not the large field alignment system 290 is being used.

Figure 6A:
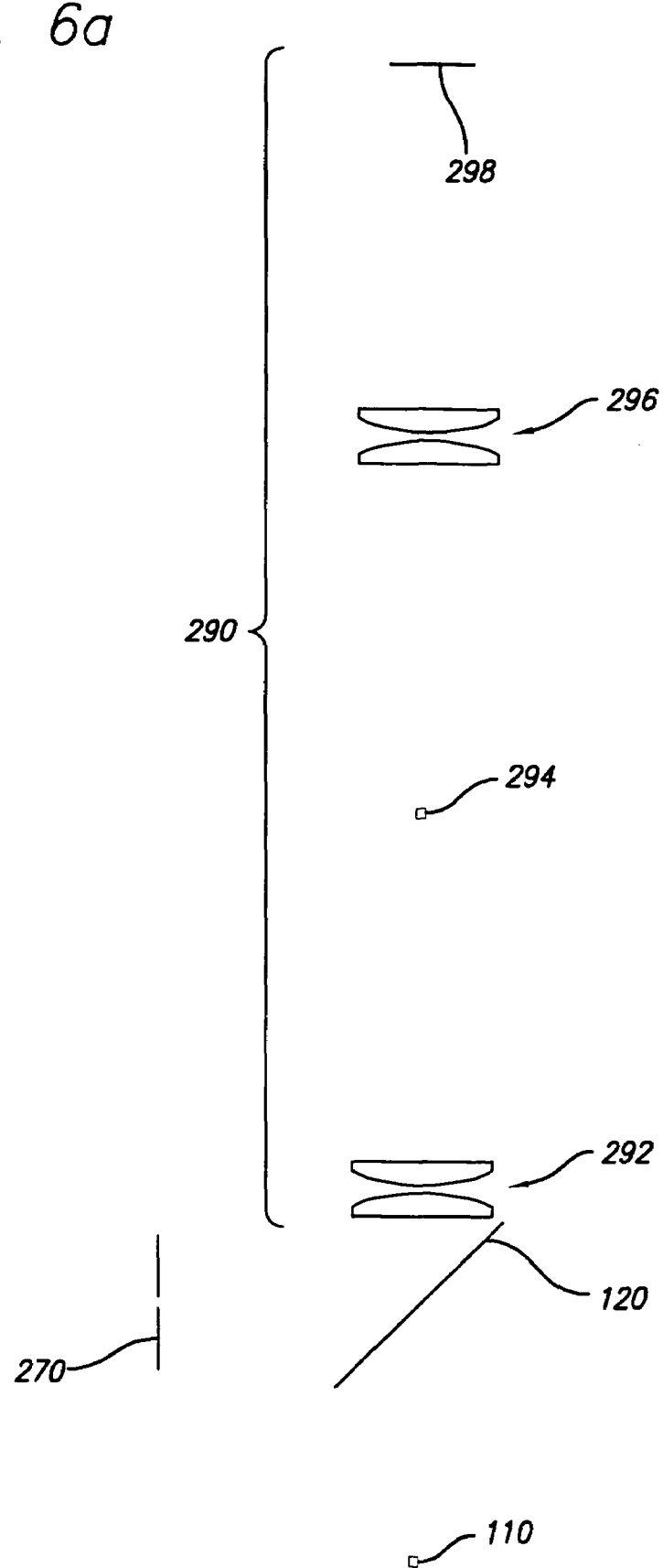

All that is required of large field alignment system 290 is that it forms an image of alignment device 270 on a sensor. FIG. 6a shows one approach to implementing the large field alignment system 290. The large field alignment system 290 has a first relay 292 and a second relay 296. The purpose for using two relay systems is to form a real image of the alignment device 270 proximate to point 294. In addition to forming an image of the alignment device 270, the first relay 292 will also form an image of the source 110 proximate to point 294. While it may be possible to prevent significant amounts of light from being transmitted through the beamsplitter 120, it is possible that enough light will enter the large field alignment system 290 that a portion of it must be blocked. By placing an obscuration proximate to point 294, which is the image of the source 110, it is possible to block the light from the source 110 while passing the light reflected off of the alignment device 270. Relay 296 images light from alignment device 270 onto detector 298. The purpose of the large field alignment system is to image the alignment device 270 and a region around it onto a detector. The exact size of the field will depend on the tolerances of the components used. The field can easily range from a tenth of a millimeter larger than the alignment device 270 to many millimeters larger than the alignment device 270. The actual design of the optics may vary from what is shown in FIG. 6a. Single element relays may be used or more complex systems may be required. It may be advantageous to include a field lens proximate to obscuration 294. These design permutations are well known in the art.

In the system shown in FIG. 6, the flat alignment surface 144 resulted in a ring of illumination on the alignment device 270. The radius of curvature and the location of the center of curvature of alignment surface 144 could be modified so that a well-focused spot is formed at the alignment device 270. Since the required change in the alignment surface 144 will depend on the details of the UUT 130, the best solution will depend on the number of different types of optics that will be tested. If the reflective optic 140 has a non-parabolic surface, the reference surface 144 can still be changed to form a well-focused spot at the alignment device 270. If one needed additional precision, one could make the reference surface 144 a conic or more general aspheric surface.

Figure 7:
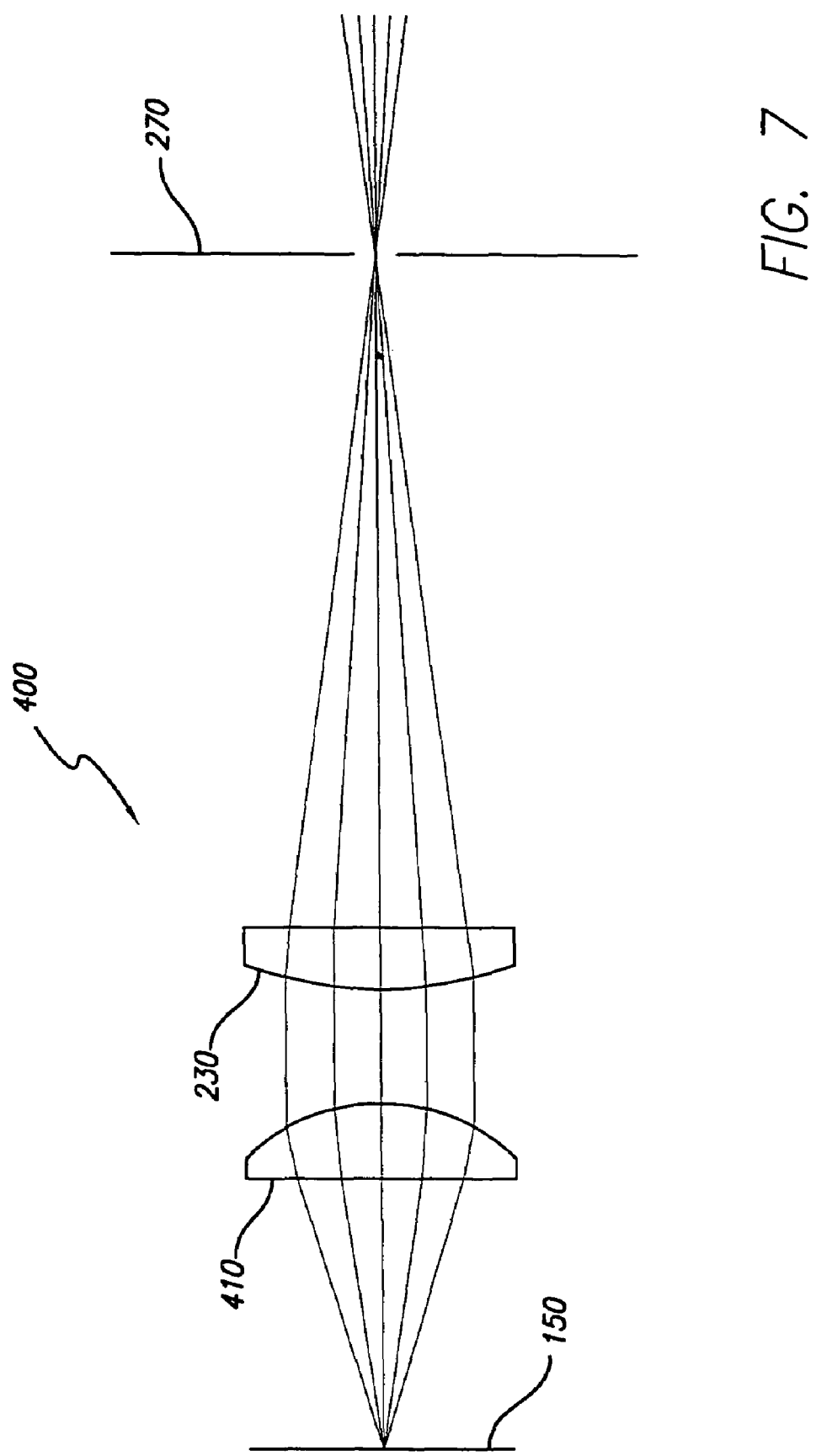
FIG. 7 is a diagram of one approach for implementing the small field alignment system.

If the reference surface 144 is modified to form a well-focused spot on the alignment device 270, the large field alignment system may not be able to detect the returned spot and determine if the reflective optic 140 is aligned. To accommodate this, FIG. 7 shows a small field alignment system 400 that can be included to capture images so the spot can be aligned to the alignment device 270. The field of view of the small field alignment system 400 will vary, depending on the particular implementation. In one embodiment, the small field of view alignment system 400 may cover less than half of the field of view as the large field alignment system 290. In another embodiment, the small field alignment system 400 may cover a field of view that is larger than the field blocked by obscuration 294. In yet another embodiment, the small field alignment system 400 may cover a field that, in conjunction with the size of the resolution elements of the sensor, results in an uncertainty in the spot location and size that allows one to align elements to within their required tolerance.

One approach to implement the small field alignment system 400 would be to incorporate a beamsplitter in alignment device 270 whose surface normal is substantially centered on the cone of incident rays. Some of the light passing through alignment device 270 would be reflected and directed into large field alignment system 290. By incorporating a beamsplitter, the large field alignment system 290 and the small field alignment system 400 can be implemented with the same optics. Another approach would be to insert a beamsplitter or removable fold mirror after alignment device 270 coupled to optics and a detector that will form an image of the alignment device 270. One embodiment is shown in FIG. 7. An additional optic 410 is inserted into the path after the alignment device 270 so that the alignment device 270 is imaged onto the detector. FIG. 7 shows a single element lens between optical system 230 and detector 150. Those skilled in the art will recognize that a multi-element optic may be used and that the additional optic 410 may be placed at any convenient location between the alignment device 270 and the detector 150. In this embodiment, the same detector 150 is used both to capture interference patterns and for alignment. What is also desired in the implementation of the small field alignment system 400 is that none of the optical elements in optical system 230 need to be moved.

Figure 8:
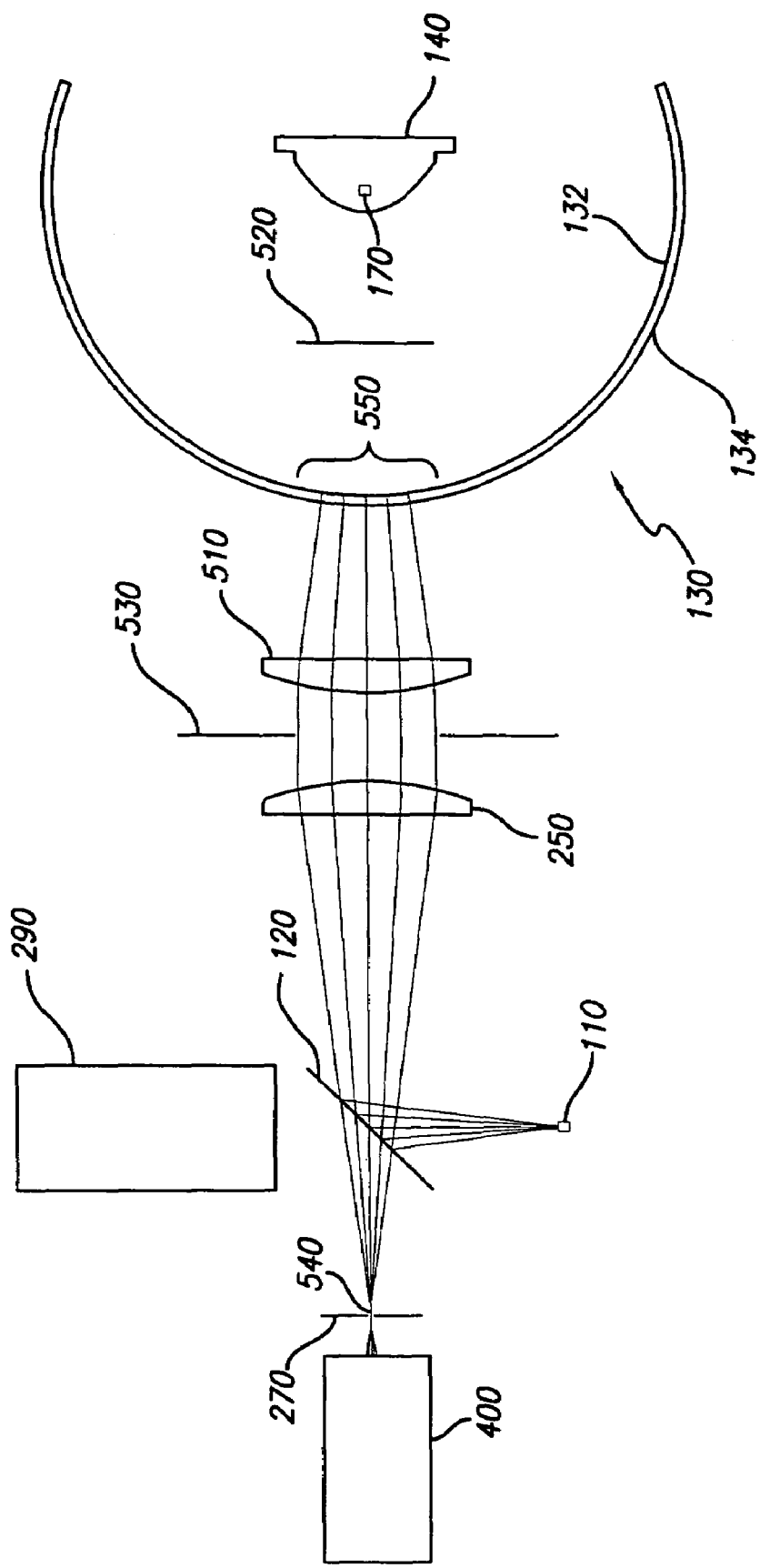
FIGS. 8 and 8A are diagrams of a coarse alignment mode.

In addition to having a method for aligning the reflective optic 140, it is desirable to have a coarse alignment mode for positioning the UUT 130. FIG. 8 shows how this can be accomplished. Coarse alignment optic 510 is added to the system. This optic is designed such that it operates on the light transmitted by optic 250 and forms a substantially small image of the source that is proximate to the short focus 170 of the reflective optic 140. When this is accomplished and the UUT 130 is placed in the correct location, the light leaving the coarse alignment optic 510 may be substantially normally incident on surface 132 and surface 134. This means that the Fresnel reflections from the surfaces 132 and 134 may substantially retrace the path of the incident illumination. This light may form a substantially small image of the source 540 in the plane of the alignment device 270 and this spot 540 and the alignment device 270 may be imaged onto a detector included in the small field alignment system 400. Some of the light transmitted through the UUT 130 may be reflected by the reflective optic 140 and result in stray light. By placing a beam block 520 between the UUT 130 and the reflective optic 140, this stray light can be blocked.

If the UUT 130 is not well aligned, the image of the source 540 may not be in the correct location or it may not be substantially small. For large misalignments, the size and location of the spot can be determined with the large field alignment system 290. The UUT 130 can be adjusted until the spot 540 can be imaged by the small field alignment system 400. The UUT 130 can then be adjusted further until the spot 540 is substantially small and proximate to the ideal location defined by the alignment device 270. Because the coarse alignment optic 510 provides for a relatively low sensitivity, it is possible that the UUT 130 will not be adequately aligned after the coarse alignment process has been completed. When the coarse alignment optic 510 is removed, an image of the source will be formed proximate to the alignment device 270. It may be necessary to reduce the diameter of the beam with an aperture 530. This aperture is sized to prevent light from reflecting off of the alignment surface 144 and reaching the detectors. If the image does not pass through the alignment device 270, then the large field alignment system 290 can be used to align the UUT 130 with finer sensitivity. Once the image of the source is detected by the small field alignment system 400, the small field alignment system 400 can be used for a final alignment. For a specific UUT design, and based on the variation in the populations of UUTs 130, and the repeatability of the conventional support means 131, it may not be necessary to align the UUT 130 with the large field alignment system 290 and the small field alignment system 400 in conjunction with the coarse alignment optic 510 and then use the large field alignment system 290 and the small field alignment system 400 without the coarse alignment optic 510. A subset of these steps may be adequate once the initial alignment is completed during production.

Figure 8A:
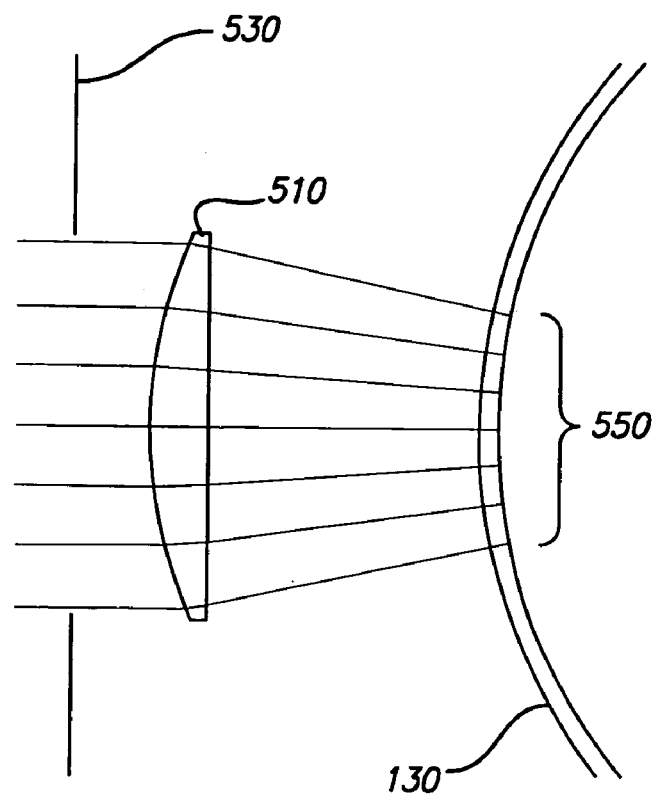

The system shown in FIG. 8 also allows for an additional measurement. If the coarse alignment optic 510 is in place and the small field alignment system 400 is configured to capture the interference pattern, then the transmitted wavefront of a portion of the apex region of the UUT 550 can be directly measured. The apex region of the UUT 550 is the region of the UUT 130 that transmits light on the way to the reflective optic 140 or on the way back from the reflective optic 140. Since the beam used to measure the full UUT 130 must pass through apex region two additional times, it is possible for errors in the apex region to change the direction of a ray. This means that the ray will not be incident on surfaces 132 and 134 in the expected locations. This is called mapping error. By measuring the transmitted wavefront at the apex region of the UUT 550, the mapping error can be estimated and, if necessary, corrected. The system shown in FIG. 8 is only able to measure a portion of the apex region of the UUT 550 that can result in mapping error. FIG. 8a shows how increasing the numerical aperture of the beam incident on the UUT 130 will allow for a complete measurement of the apex region of the UUT 550 and, if required, some of the region surrounding the apex region of the UUT 550.

Figure 9A:
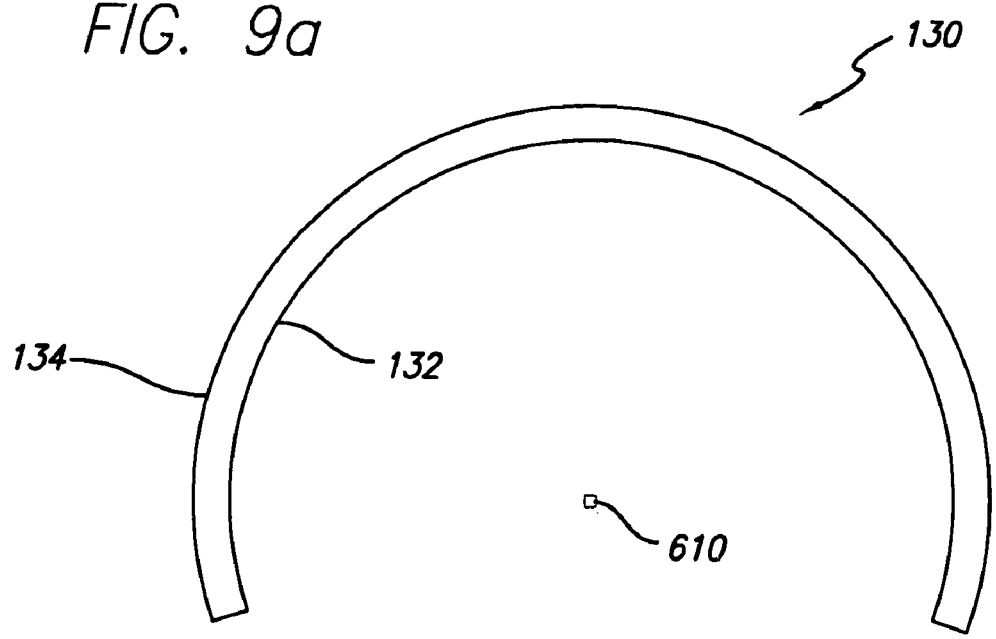
FIGS. 9A-9C show examples of some of the different categories of optics that could be tested with the present invention.

Up to this point, the UUT 130 has only been described as an optical element with concentric spherical surfaces. The interferometer described can test other shapes. FIG. 9 shows several different types of optics that could be tested with the present invention. FIG. 9a shows a UUT 130 that is a concentric spherical shell. A concentric spherical shell has at least two paired optical surfaces. The first surface 132 is a section of a sphere whose center of curvature is located at point 610. The second surface 134 is also a section of a sphere whose center of curvature is proximate to point 610. A manufactured concentric spherical shell cannot be made perfectly, so the center of curvature of the first surface 132 will not be exactly at the same location as the center of curvature of the second surface 134. An optic that is a concentric spherical shell will have the two centers of curvature at the same point in the ideal part. It should be clear that optics that have a substantially small distance between the centers of curvature in the ideal case can still be considered a concentric spherical shell.

Figure 9B:
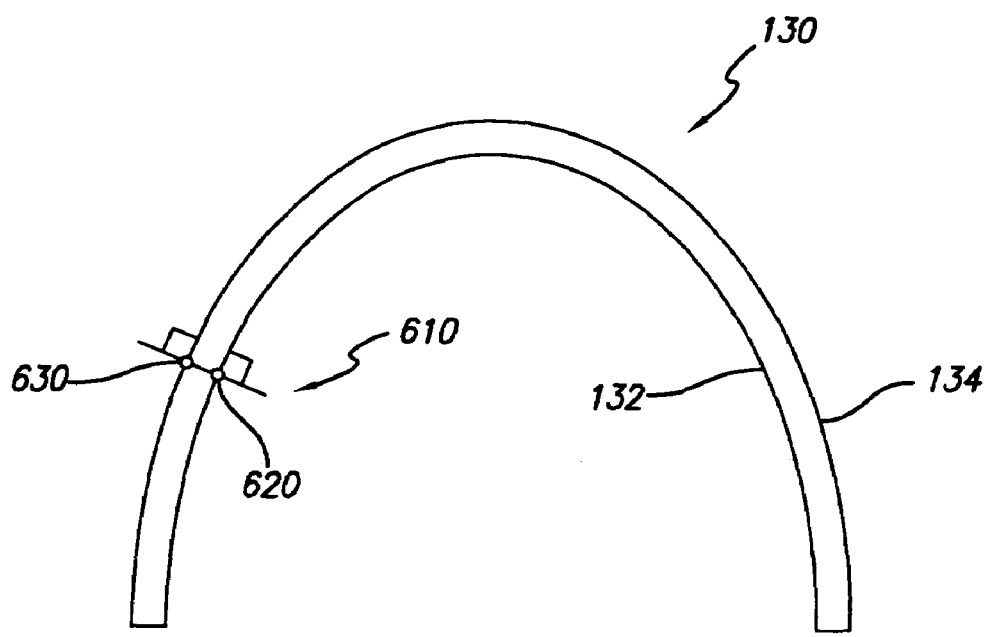

FIG. 9b shows a UUT 130 that is a substantially constant thickness optic. The first and second surfaces 132 and 134 in this example are not sections of a sphere although a concentric spherical shell is a special case of a substantially constant thickness optic. The surfaces could be conics, odd or even aspheres, revolutions of splines or any other class of surfaces. In order for an optic to be considered a substantially constant thickness optic, the surface normal 610 for any point 620 on the first surface 132 is substantially the surface normal for a point 630 on the second surface 134. Once again, manufacturing tolerances do not allow for an optic that absolutely meets this requirement.

Figure 9C:
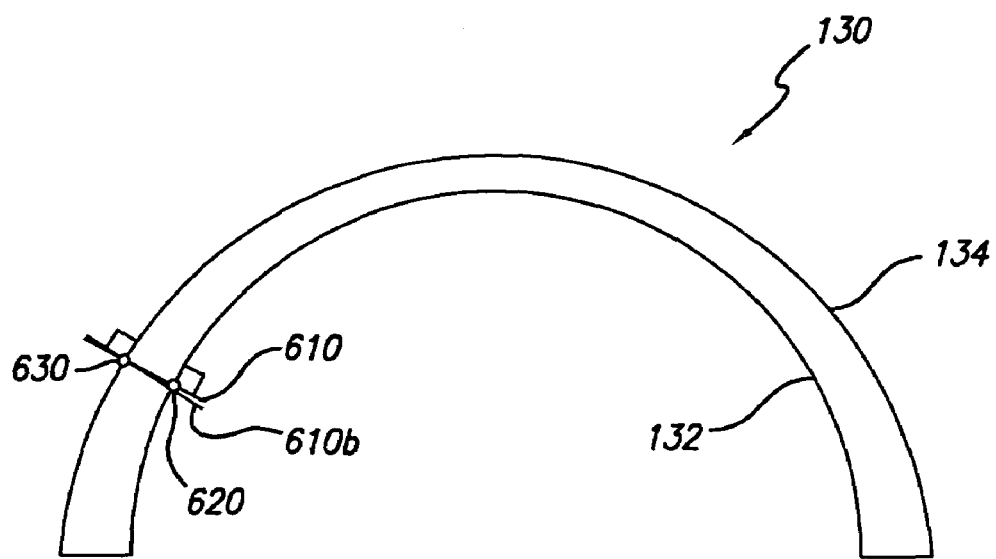

FIG. 9c shows a UUT 130 that is a substantially non-constant thickness optic. In this example, both surfaces 132 and 134 are spherical, but more general surfaces are envisioned. In this example, the first surface normal 610 is shown for point 620 on the first surface 132. The first surface normal 610 intersects the second surface 134 at point 630. The second surface normal 610b for point 630 on the second surface 134 is not parallel to the first surface normal 610. One simple example of a substantially non-constant thickness optic is an optic whose first and second surfaces 132 and 134 are spherical but the surfaces do not have substantially the same centers of curvature.

The present invention can measure the transmitted wavefront for concentric spherical shells, substantially constant thickness optics, and substantially non-constant thickness optics. Each different dome-like optic may result in a slightly different test configuration, but all will share the same approach. Light from a source is transmitted through the optic being tested, the light is then reflected by a reflective optic, the light is then incident on the optic being tested, and a first portion of the light is reflected by the first surface and a second portion of the light is reflected by the second surface. Both portions of reflected light are then reflected by the reflective optic, they are then transmitted by the optic being tested, and ultimately are incident on a detector. There may be some degree of coherence between the first and second portions of light so that they coherently add and form an interference pattern that is recorded by the detector. This interference pattern is either a direct or indirect measurement of the transmitted wavefront of the UUT 130. One example of when the interference pattern is an indirect measurement of the transmitted wavefront of the UUT 130 is when the interferometer is setup in a substantially non-null configuration. In this case, there may be retrace and mapping error in the interference pattern that would have to be compensated for with post-processing.

When the UUT 130 is a substantially constant thickness optic whose shape does not depart significantly from a concentric spherical shell, a near null configuration can be obtained by adjusting the location and shape of the reflective optic. For example, consider a UUT 130 that has an inner surface whose base radius of curvature is 100 mm, has a fourth order aspheric term of $10^{-8}$ and a clear aperture is 180 mm. This surface has over 0.65 mm of departure from a 100 mm radius of curvature sphere. By adjusting the focus on the reflective optic and allowing it to be an aspheric mirror, it is possible to reduce the residual error so that the test is within one wave of a null test if the UUT 130 is reasonably thin.

When the UUT 130 is a substantially constant thickness optic but not a concentric spherical shell, an aberrated point source is required to have substantially normally incident light over the inner and outer surfaces 132 and 134. The reflective optic 140 needs to be modified so that it produces a virtual image that has the required aberrations.

When the UUT 130 is a constant thickness optic that departs significantly from a concentric spherical shell, it may not be practical to generate the required aberrations in single element reflective optic 140. Multi-element reflective optics that may include one or more refractive surfaces can be used. There will be cases where a near null configuration is not practical for a substantially constant thickness optic. If the UUT 130 is a substantially non-constant thickness optic, then it is not possible to generate normally incident light on the first and second surfaces 132 and 134 because they each require different aberrations in the incident wavefront. When this is the case, it is still possible to estimate the transmitted wavefront from the measured interference data with additional post-processing of the data.

Figure 10:
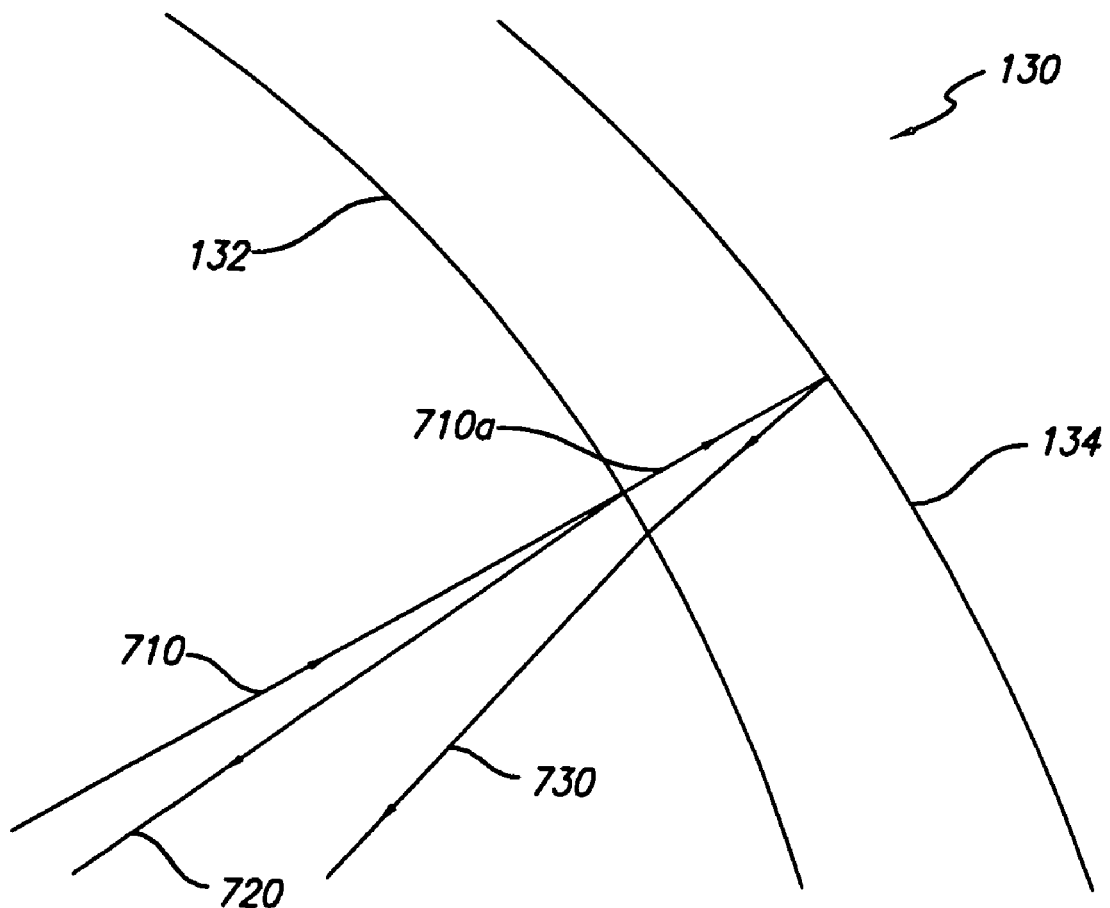
FIG. 10 shows the source of the shear that is seen when non-constant thickness optics are tested.

FIG. 10 shows what happens when a non-constant thickness optic is tested. An incident ray 710 is shown as well as the first portion of reflected light 720 and the second portion of reflected light 730. Because the incident ray 710 is not normally incident on the first surface 132, the first portion of reflected light 720 does not retrace the incident path. After refracting at the first surface 132, the incident ray 710 turns into the refracted ray 710a. In this example, the refracted ray 710a is not normally incident on the second surface 134. The second portion of light is reflected from the second surface 134 and follows path 730 after exiting the UUT 130. The rays 710, 720 and 730 represent wavefronts. Both reflected rays 720 and 730 return to the reflective optic 140 but by different paths than the incident ray 710. Because the localized wavefronts represented by rays 720 and 730 will not overlap on the detector 150, they will not interfere. There will, however, be a section of the wavefront of the second portion of reflected light that will overlap with ray 720. This means that the first and second portions of reflected light will still coherently add and form an interference pattern. There will be retrace error in the interference pattern that will show up predominantly as a position dependant shear. Preferably, one would design the reflective optic 140 to minimize the shear over the aperture. One can use the expected shape of the UUT 130 to determine what the actual transmitted wavefront would be. As the variation in thickness increases, the density of the fringes on the detector will increase. Any number of conventional approaches can be used to capture the interference pattern as the number of fringes increases. One could use a higher resolution sensor, sub-Nyquist sampling or a scanned detector.

The source 110 used in this interferometer could be any type of source that could produce an interference pattern. Long coherence length sources such as lasers are commonly used in interferometers and would be appropriate for this invention. With a conventional laser, one would generate a static interference pattern. With this, one can find the fringe centers and calculate the transmitted wavefront.

One embodiment for the source utilizes a source capable of phase shifting so that any one of a number of phase shifting algorithms can be used. If one uses a long coherence length laser as the source, one possible way to implement phase shifting would be to shift the wavelength of the laser. There are many ways described in the prior art for varying the wavelength of a laser. Two examples are a tunable dye laser or a laser that includes an adjustable grating to vary the feedback as a function of wavelength. Another approach to wavelength shifting utilizes a broad band source such as an LED. An LED's peak wavelength is a function of temperature. By heating or cooling the LED, it is possible to change the wavelength in a controlled manner and implement a phase shifting algorithm. Another approach for wavelength shifting is to use a broad band source and an adjustable band pass filter. Many band pass filters shift to shorter wavelengths as they are tilted. By controlling the tilt, it is possible to change the wavelength. It would also be possible to switch between multiple filters where each passes a different band. Another approach for wavelength shifting is to switch between multiple lasers that emit different wavelengths. This could also be accomplished with a single laser that allows one to select from multiple lines. Many other forms of wavelength shifting known in the art may be used.

Another embodiment is for the source 110 to be a time-delayed source (TDS). Because of the nature of the TDS, it is straightforward to incorporate phase shifting. Many of the other advantages of the TDS would be valuable for this interferometer. For example, a UUT 130 that has structure between the first surface 132 and the second surface 134 can be easily tested when a TDS is used.

Figure 11:
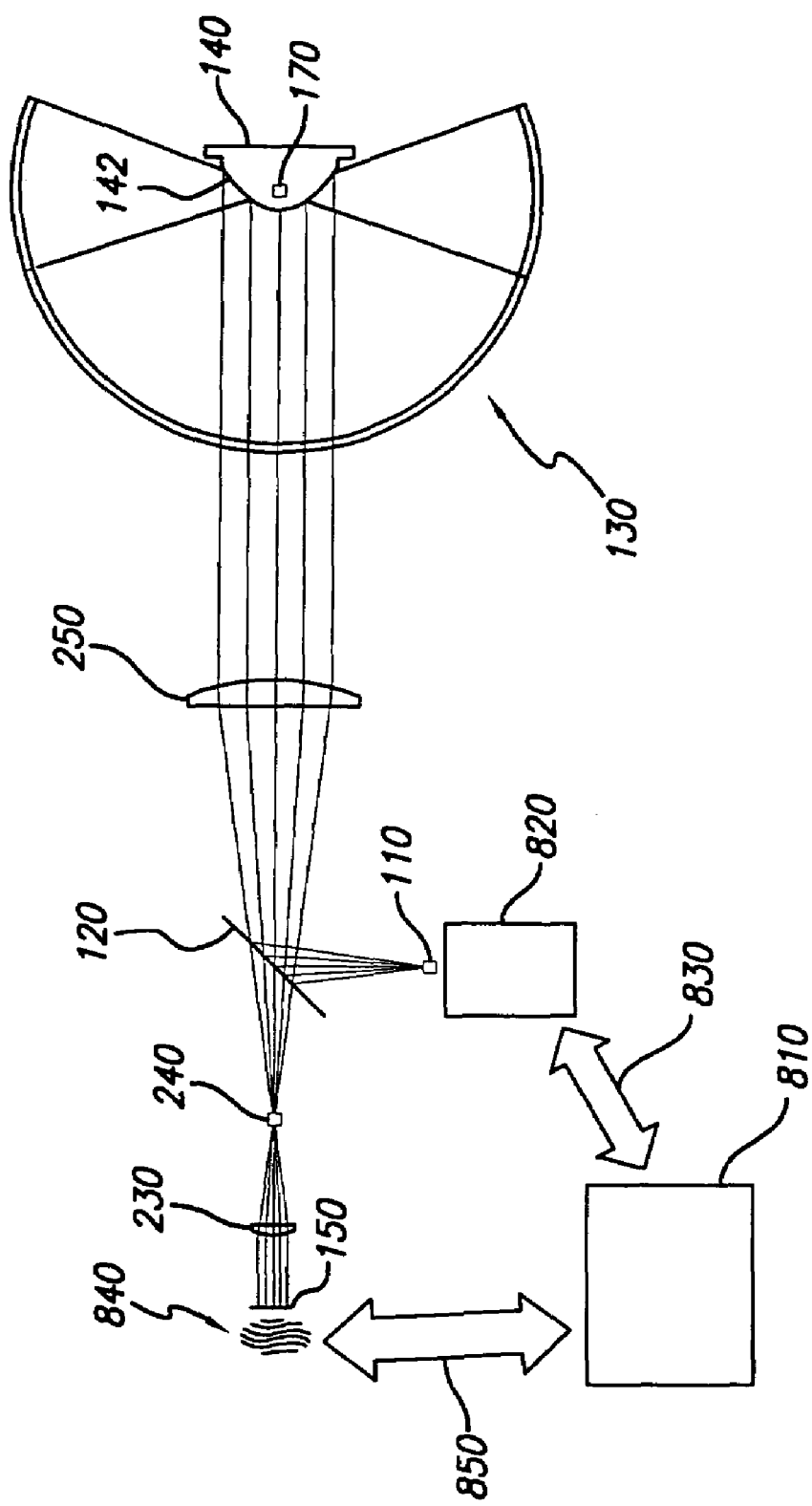
FIG. 11 is a schematic drawing that shows how phase shifting can be implemented.

FIG. 11 shows one possible way to implement phase shifting. In an embodiment, a computer 810 is used to control the interferometer. The light source 820 which forms source 110 has a source communications means 830 for the computer 810 to control the relative phase in the interference pattern 840, which is captured by the detector 150. In one embodiment, the source communications means 830 allows for two-way communication to allow information on the status of the source to be sent to the computer 810. The detector is controlled by the computer via the detector communications means 850. In an embodiment, the detector communications means 850 allows for two way communication so that the computer 810 can trigger the detector 150 to capture the interference pattern 840 and then the detector can transmit an image of the interference pattern 840 to the computer 810. By controlling the light source 820 to change the relative phase in the interference pattern 840, many different phase shifting algorithms can be implemented to convert the interference pattern 840 into a wavefront map.

For some UUTs 130, it may not be possible or practical to test the full aperture of interest in one measurement. One example of this would be a hyper-hemisphere that subtends and angle of greater than 270 degrees. While it is possible to design a reflective optic 140 that will fill such a UUT 130, it may not be practical to fabricate one. In this circumstance, it is possible to test the full aperture of the UUT 130 by rotating it about an appropriate point and taking multiple measurements that cover the full aperture.

Those skilled in the art will know, or be able to ascertain using no more than routine experimentation, many equivalents to the specific embodiments of the invention described herein.

What is claimed is:

1. An interferometer comprising a source for emitting light, a support for supporting a unit under test where the unit under test has at least a first surface and second surface, a reflective optic, and a detector, wherein the light from the source is transmitted through the unit under test, reflects off the reflective optic, which directs the light back to the unit under test where a first portion of light is reflected off the first surface and a second portion of light is reflected off the second surface and the first and second portions of light are then reflected by the reflective optic, are then transmitted through the unit under test, and are incident on the detector where the first and second portions of light coherently add and an interference pattern is detected by the detector.

2. An interferometer of claim 1 where the reflective optic has a short focus and a long focus.

3. An interferometer of claim 2 further comprising an alignment surface.

4. An interferometer of claim 3 where the alignment surface is a portion of a sphere whose center of curvature is proximate to the long focus of the reflective optic.

5. An interferometer of claim 3 where the alignment surface is a portion of a sphere whose center of curvature is proximate to an image of the long focus of the reflective optic.

6. An interferometer of claim 1 further including the unit under test.

7. An interferometer of claim 6 where the unit under test is a concentric spherical shell.

8. An interferometer of claim 6 where the unit under test subtends a solid angle greater than $2\pi$ steradians.

9. An interferometer of claim 6 where the unit under test is a substantially constant thickness optic.

10. An interferometer of claim 6 where the unit under test is a substantially non-constant thickness optic.

11. An interferometer of claim 6 where the interference pattern includes light from all regions of interest on the unit under test.

12. An interferometer of claim 1 where the reflective optic is a conic.

13. An interferometer of claim 12 where the reflective optic is a parabola.

14. An interferometer of claim 1 where the reflective optic is an asphere.

15. An interferometer of claim 1 further comprising an alignment surface.

16. A method for measuring the transmitted wavefront of a unit under test, the method comprising providing an interferometer comprising a source for emitting light, a support for supporting a unit under test where the unit under test has at least a first surface and second surface, a reflective optic, and a detector;

providing the unit under test in the interferometer;

transmitting the light from the source through the unit under test to the reflective optic, where it reflects off the reflective optic and is directed back to the unit under test where a first portion of light is reflected off the first surface and a second portion of light is reflected off the second surface, wherein the first and second portions of light are then reflected by the reflective optic, are then transmitted through the unit under test, and are incident on the detector where the first and second portions of light coherently add; and detecting an interference pattern by the detector.

* * * * *